June 21, 1960 C. R. KEYS 2,941,690
LOADING AND DUMPING RECEPTACLE AND CLOSING CONSTRUCTION
AND FASTENING CONSTRUCTION THEREFOR
Filed Sept. 26, 1955 4 Sheets-Sheet 1
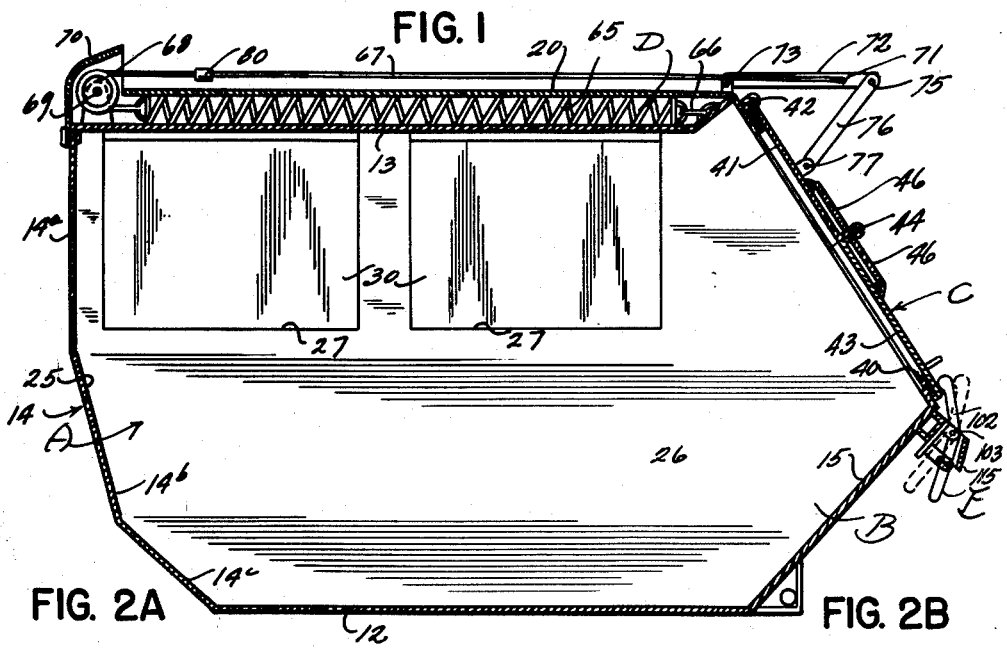
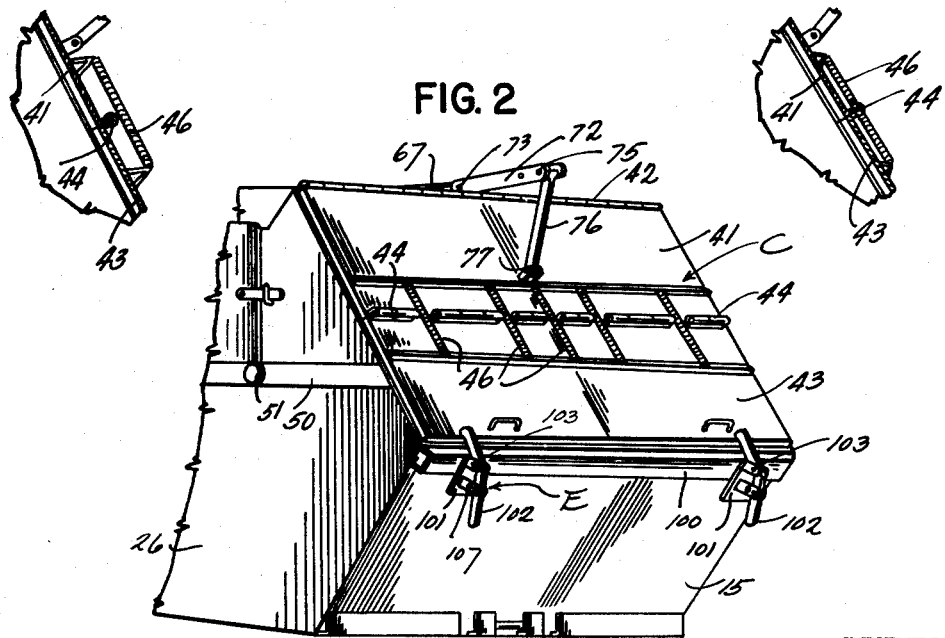
INVENTOR
Conrad R. Keys
BY
ATTORNEYS June 21, 1960

C. R. KEYS 2,941,690

LOADING AND DUMPING RECEPTACLE AND CLOSING CONSTRUCTION
AND FASTENING CONSTRUCTION THEREFOR

Filed Sept. 26, 1955

INVENTOR
Conrad R. Keys

BY *Lancaster, Allwine & Rommel*

ATTORNEYS

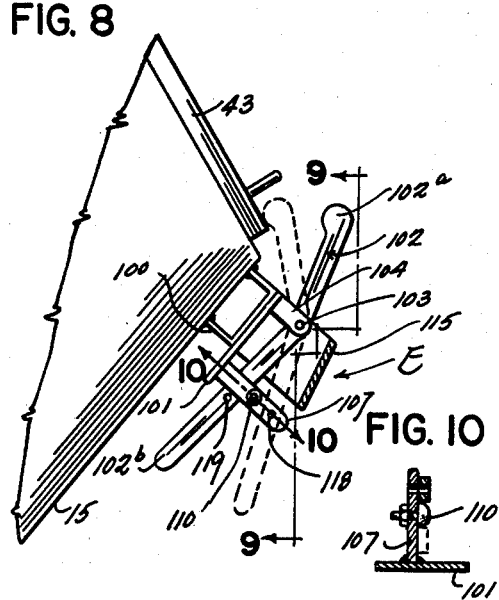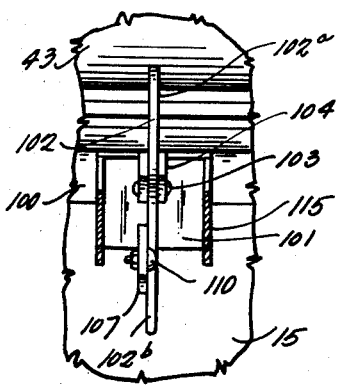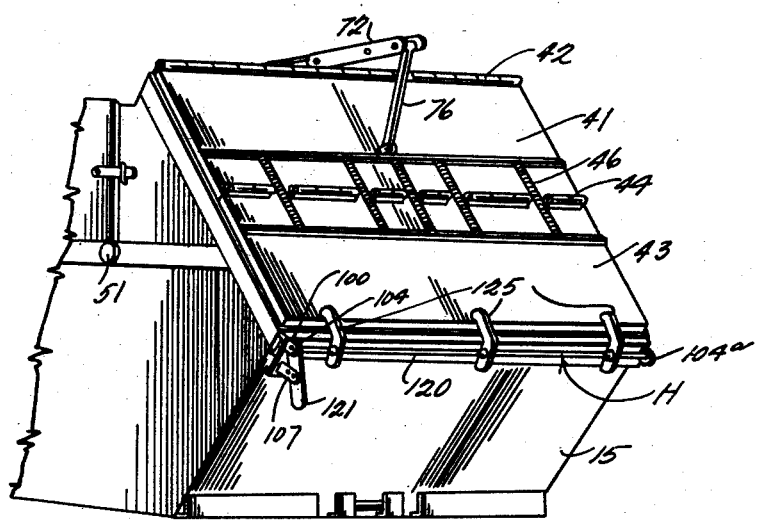

June 21, 1960 C. R. KEYS 2,941,690
LOADING AND DUMPING RECEPTACLE AND CLOSING CONSTRUCTION
AND FASTENING CONSTRUCTION THEREFOR
Filed Sept. 26, 1955 4 Sheets-Sheet 4

INVENTOR
Conrad R. Keys

ATTORNEYS

United States Patent Office 2,941,690
Patented June 21, 1960

2,941,690

LOADING AND DUMPING RECEPTACLE AND CLOSING CONSTRUCTION AND FASTENING CONSTRUCTION THEREFOR

Conrad R. Keys, 702 Ridge St., Newark, N.J.

Filed Sept. 26, 1955, Ser. No. 536,649

6 Claims. (Cl. 220—34)

This invention relates to improvements in dumping receptacles and has particular reference to a closure construction and latching or fastening means therefor.

In my copending application Serial 463,646, filed October 21, 1954, I have shown and described a type of loading and dumping receptacle intended to be used with hoisting mechanism for its placement upon vehicles, docks, decks, and the like, in association with means to tilt the same for the dumping of contents therefrom.

The loading and dumping receptacle of the present invention closely follows the general construction of the receptacle of my said copending application, and differs thereover in spring means for controlling the closing and opening of the lids or closures at the dumping and charging ends of the receptacle, and a means for the latching or fastening of such closures.

A further object of this invention is the provision of an improved readily accessible and easy operable latching or fastening mechanism for controlling closures.

A further object of this invention is the provision of a multiple door construction for buckets or receptacles having improved spring means associated therewith for cooperative action upon the door sections so that an operator need not apply exhausting effort for opening and closing of the door sections; the springs assisting in performing the operations. This enables a very large door construction to be provided and so manipulated that the opening to the bucket is unimpeded for receiving or dumping of large articles and quantities of debris. The spring construction may specifically include spring means positioned with respect to the hinge of the upper door section so that it will act, under tension with a normal tendency to open the upper door section, or under tension to act with a negative effect in opening the upper door section, or with a normal tendency to hold the upper door section closed. The lower door section hinged to the upper door section has associated spring means acting with a tendency when closed to normally hold the lower door section closed, or with a tendency to open the same, or to act with no appreciable effect in opening the lower door section from a closed position.

Other objects and advantages of this invention will be apparent during the course of the following detailed description.

In the accompanying drawings, forming a part of this specification, and wherein similar reference characters designate corresponding parts throughout the several views:

Figure 1 is a longitudinal cross sectional view taken through the receptacle, showing improved spring means for control of the closure parts and improved latch or fastening means for releasably holding the closure in a shut position.

Figure 2 is a fragmentary perspective view of the rear end of the loading and dumping receptacle, showing the doors or lids closed and their associated arrangement of springs and latches.

Figure 2ª is a fragmentary cross sectional view showing the springs connecting the upper and lower door sections of the bucket of Figure 1 under tension above the normal hinge axis, with a tendency to swing open the lower door section.

Figure 2ᵇ is a fragmentary cross sectional view showing the springs for the upper and lower door sections of the bucket of Figure 1 tensioned in sheer with the spring axis passing directly through the hinge axis of the two door sections. When closed the said springs will have a negative effect in opening the lower door section.

Figure 3:
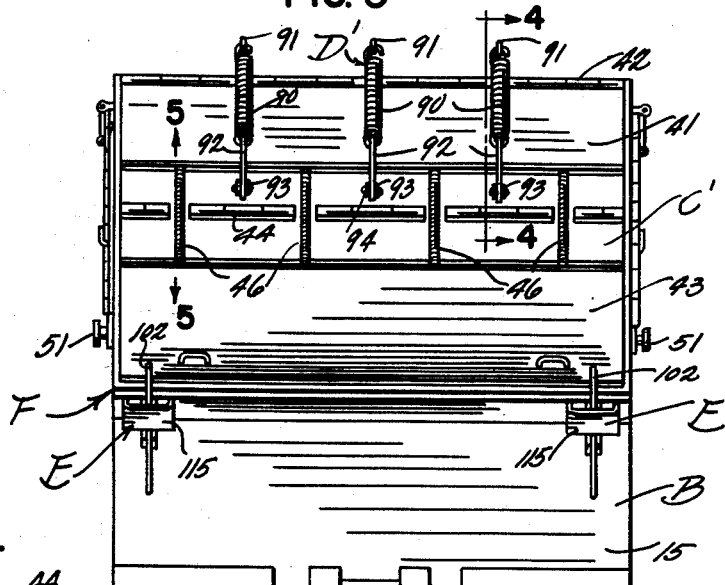

Figure 3 is a rear view of a loading and dumping receptacle, of a type, with some variations, which has been more specifically described in my aforesaid copending application Serial No. 463,646, filed October 21, 1954; the improvements consisting in the arrangement of springs and latches for the closure lids or sections.

Figure 4:
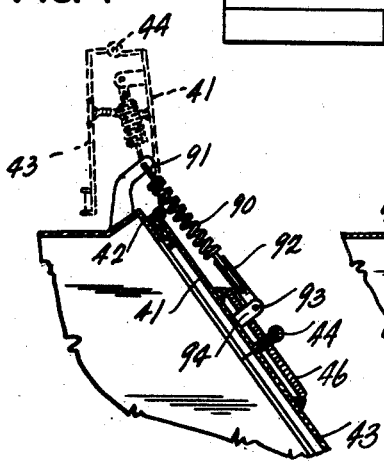

Figure 4 is a fragmentary cross sectional view of the closure lid construction shown in Figure 3, with the lids shown closed in full lines, and shown in opened position, in dotted lines. In this view the upper lid section spring is under tension above the hinge axis of the upper lid section. The springs connecting the two lid sections are located below the hinge axis of the two lid sections, so as to normally act with a tendency to close the lower lid section; the view being taken substantially on the line 4—4 of Figure 3.

Figure 5:
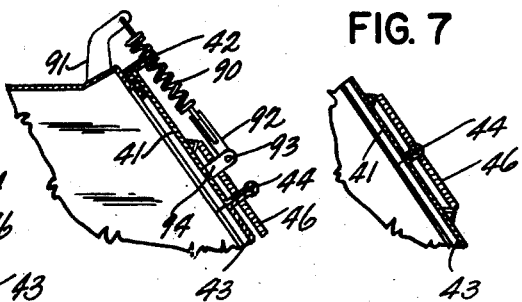

Figure 5 is a fragmentary cross sectional view similar to Figure 4, with the upper lid section spring extending in line directly through and in intersecting relation with the hinge axis of the upper lid section upon the body of the bucket.

Figure 6:
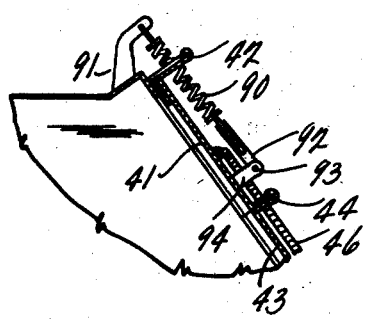

Figure 6 is a fragmentary cross sectional view showing details similar to that shown in Figures 4 and 5, but with the spring for the upper lid section lying in a line below the hinge axis of the upper lid section upon the body of the bucket, and thus acting with a normal tendency to hold the upper lid section closed, when it is shut.

Figure 7:
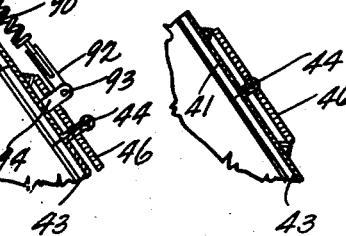

Figure 7 is a view showing that the upper and lower lid sections may have their springs intersecting the hinge axis of the two lid sections.

Figure 7ª is a fragmentary cross sectional view similar to Figure 7 but with the spring lying in a line above the hinge axis of the two lid sections.

Figure 8 is an enlarged view, partly in section, of the improved latching or fastening means for the closures of my loading and dumping receptacle.

Figure 9 is a cross sectional view taken through the latching means of Figure 8, substantially on the line 9—9 of Figure 8.

Figure 10 is a cross sectional view taken on the line 10—10 shown in Figure 8.

Figure 11 is a fragmentary perspective view of the rear end of the loading and dumping receptacle, having a closure arrangement of the multiple lid type generally described in my aforesaid copending application, showing a modified form of latching or fastening means.

Figure 12:
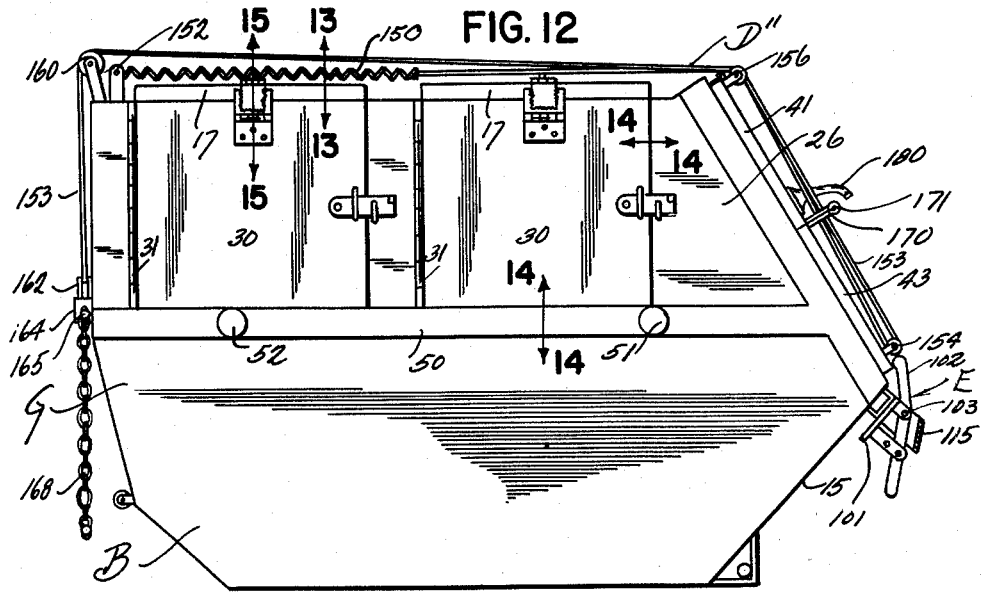

Figure 12 is a side elevation of the loading and dumping receptacle having an improved association of parts whereby a spring will normally hold the closure sections in a shut position until the receptacle is tilted; the view also showing my improved latching or fastening means, partly in section.

Figure 13:
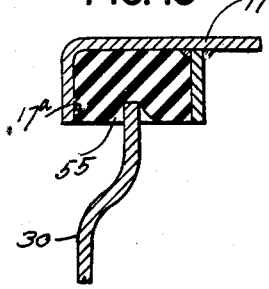

Figure 13 is a cross sectional view taken substantially on the line 13—13 of Figure 12, showing a sealing gasket arrangement for the top and side closures of the type of receptacle shown in Figure 12.

Figure 14:
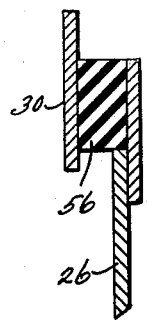

Figure 14 is a cross sectional view taken on either of the lines 14—14 of Figure 12.

Figure 15:
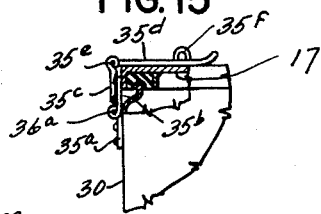

Figure 15 is a fragmentary sectional view taken substantially on the line 15—15 of Figure 12, showing an improved type of hasp or fastener arrangement for holding the top and side closures of the receptacle in closed position.

Figure 16:
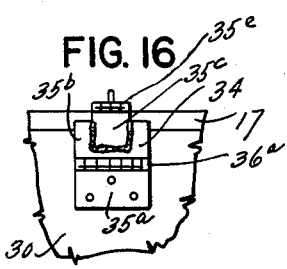

Figure 16 is a fragmentary view of portions of the top and side closures of the receptacle, showing the hasp type fastening means of Figure 15.

In the drawings, wherein similar reference characters designate corresponding parts throughout the several views, the letter A may generally designate the type of loading and dumping receptacle shown in Figure 1, employing a body portion B with closure means C therefor. Means D is provided to facilitate closing and opening actions of the lids of closure means C. An improved latch means E is provided for normally holding the closure parts in a shut position upon the body B.

In the form of receptacle F, shown in Figure 3, the body B is generally of the same configuration as the body B of the receptacle A, and the closure arrangement C′ has a modified form of spring means D′, more specifically set forth in my copending application above referred to, but differing thereover in certain essentials to be subsequently described; the arrangement of springs being modified for the purpose of controlling the closing and opening of the lid sections of the closure arrangement. In the form of receptacle G shown in Figure 12 the body B is generally the same as that of the body of receptacles A and F, but a modified form of spring actuated enclosure means D″ is provided.

For the forms of invention A, F and G the same latch means E may be provided, but I may also substitute a modified form of latching construction H shown in Figure 11.

Insofar as applicable the same reference characters will be applied to corresponding parts in the various forms of receptacles A, F and G. These buckets or receptacles are preferably formed of metallic plate walls, welded together and suitably reinforced to provide a one-piece structure having top, side and rear openings with suitable closures. Each receptacle body includes a bottom wall 12, a top wall 13, front end wall structure 14 and a rear wall 15. The walls 12 and 13 are shown parallel but may be in angular relation. The front wall structure 14 preferably includes an upper wall portion 14a which is positioned in right angled relation to the top wall 12; an intermediate wall portion 14b which is slightly angled rearwardly and a bottom or more acutely angled portion 14c.

The rear wall includes a lower diagonally sloping portion 15, disposed at an acute angle with respect to the plane of the bottom wall 12. When the bucket is in horizontal position it slopes upwardly and to the rear; this slope facilitating easy tilting of the bucket to a dumping position off of the rear apron of dumping vehicle, as set forth in my copending application Serial 463,646, filed October 21, 1954. It also facilitates discharge of the receptacle contents.

The top wall structure 13 as described in my copending application is preferably provided with four charging openings, two at each side of the longitudinal center of the bucket. They have individual closures 17 hinged upon the top wall at the central medial area. The receptacle bodies each include parallel side walls 26 provided with side openings 27 just below the top wall 13; the bottom edges of which are spaced appreciably above the bottom wall 12. These openings are provided in the side walls for access to the upper half of the chamber 25; the lower edges being spaced above the top edge of the rear sloping wall 15. The lower half of the chamber 25 does not have any openings or closures therein. This makes it possible to fill the chamber 25 from the top, side and rear openings. The side walls 26 are provided with closures 30 for the openings 27 hinged at 31 at the front edges of said openings. The closures 30 swing outwardly and forwardly to an open position.

The fastening construction 34 for the side and top doors preferably consists of butt hinges and a hasp. One butt hinge has a lead 35a welded or riveted to the side closure 30 and a second lead 35b hingedly secured thereto at 36a. This butt leaf 35b has a leaf 35c of a second butt hinge welded thereto and the hasp or other leaf 35d is hinged at 35e thereto and is adapted to cooperate with a staple 35f, located upon the top closure 17, for securing and locking the doors 17 and 30 in a closed relation upon the container.

The upper portion of the receptacle has a rear discharge opening 40. The slope of the wall wherein this opening is provided is at an acute angle to the plane of the top wall 13; the same sloping downwardly and rearwardly. As has been set forth in my aforesaid copending application, when the bucket is tilted to dumping position, the rear wall 15 acts as a chute to permit ready and complete discharge of the contents of the chamber 25, through the discharge opening 40.

The closure construction C for the discharge opening 40 consists of an upper discharge door portion 41, hinged at 42. A second closure 43 is hinged at 44, in complementary relation upon the free margin of door portion 41. As shown in Figure 1, these door portions 41 and 43 will normally lie in the same plane when closed, and to that extent are gravity actuated to assume closed positions over the opening 40. Springs 46 are connected at opposite ends to the door portions 41 and 43, at opposite sides of the hinged connection 44. This hinge connection 44 is located in a different position upon the receptacle A of Figure 1 than in the corresponding receptacle shown in my copending application. The axis of hinges 44 lie above the normal run of the springs 46. These springs 46 are under tension and with this arrangement they normally tend to hold the lower closure section of the door in shut position. In rest position, as shown in Figure 1, the weight of the lid sections will assist in holding them closed, and the springs 46 also act to normally close the lower section. However when the bucket or receptacle is slightly tilted, the lower section, at a predetermined degree of tilting, will swing open by gravity, and when the springs 46 pass the axial line of hinges 44 they also assist in the opening action. Stops may be provided, as shown in my copending application above mentioned, to limit the opened relation of the lower closure section with respect to the upper closure section.

I may also elect to have the tension springs 46, as shown in Figure 2a, lie above the axis of the hinge 44, or as shown in Figure 2b the axial line of the tension springs, when the lid sections are closed, may pass directly through the hinge axis 44. In the form shown in Figure 2a the spring 46 would thus have a tendency to normally open the lower lid section with respect to the upper lid section, and the spring tension when the lids are closed, in the form shown in Figure 2b, would have no closure operating effect.

The body structures of the receptacles are marginally reinforced about all of the openings, and especially the rear discharge opening. Intermediate the height thereof the side walls 26 are provided with reinforcing rails or members 50. Upon these members 50 and the side walls 26 are preferably located headed lugs 51 and 52, relatively located at opposite sides of the center of gravity of the bucket, for connection with suitable chains or other lifting, supporting, and lowering mechanism.

In order to seal the bucket openings and closures against escape of odors and leakage, the closures may be provided with suitable sealing strips of rubber or like material. In this respect, as shown in Figure 13 of the drawings, the top closures 17 may be provided with a marginal channel 17a wherein a sealing strip 55 is placed. At the top margin this strip 55 engages with the top edge of the side closures 30. Like strips 56 may be provided upon the side doors 30, as shown in Figure 14, around the other margins of the side doors. This sort of sealing may also be provided around the margins of the discharge closures, for contact with the opening walls.

In the form of receptacle A, shown in Figures 1 and 2, I intend to use spring means D, also shown in my copending application, to assist in the opening and closing of the rear closure construction C. To that end a powerful spring 65, under tension, is located in the elongated casing 20 at the longitudinal top center of the receptacle A. Its rear end 66 is secured to the casing. The opposite end has a cable 67 connected therewith trained over a pulley 68 which is rotatably mounted at 69 upon a suitable bracket arrangement on the top wall 13. A protecting shield or shroud 70 may be located at the opened front end of the casing. The cable 67 extends rearwardly and is connected at 71 with the outer end of a pivoted crank arm 72; the latter being pivoted at 73 upon a lug type bracket at the rear end of the casing 20, as shown in Figure 1. The crank arm 72 at its outer end is pivotally connected at 75 to a strut 76 which is pivoted in turn at 77 upon the discharge closures portion 41, at a location intermediate the hinge 42 and the free end of the closure 41, as shown in Figure 1 of the drawings. The points 73, 75 and 77 when the closures are shut may represent an equilateral triangle although for different size of buckets this arrangement may vary.

The line of cable 67 in Figs. 1 and 2 is shown above pivot point 73 when the lids are closed, but this cable could just as well pass through point 73 or lie below it, depending upon strength of spring 65 and the weight of the lids.

The tilting of the bucket A for dumping purposes is best shown in my copending application above mentioned. When the bucket has been sufficiently tilted the weight of the lower section 43 will swing open by gravity and when it has moved so that the axes of the springs 46 lie above the axes of the hinges 44 the energy stored in the springs 46 will assist in further opening of the lower lid section.

When the center of gravity of the upper and lower discharge doors, incident to tilting of the receptacle, has passed a point vertically below the hinge 42, as tilting continues, effective gravity will become great enough so that a push outwardly is exerted upon strut 76 and thereby transmitted to the crank arm 72. This will cause the crank arm to move upwardly and outwardly from the body of the receptacle A. The energy stored in spring 65 will cause the crank arm 72 to rotate through an arc with pivot point 73 as a center, exerting a pull on the strut 76. The attitude of the opening of the closures is best shown in my copending application above mentioned. As the receptacle is returned from a tilted position to normal horizontal position the effective gravity on the closure 41 is increased and eventually overcomes the effort of the spring 65. The closure 41 comes to rest over the upper part of the opening 40 and subsequently the door 43 will assume about a right angled position with respect to the plane of the opening. If the bucket is jolted sufficiently back upon the chassis bed the closure 43 may move to a lower position, but will not usually close entirely except by manual intervention.

In the form of closure construction shown in Figures 3, 4, 5, 6, 7, and 7a, the bucket body is the same construction as body B, above described. The closure section 41 is provided with a series of tension springs 90 which are connected at their upper ends to short brackets 91 located upon the body of the receptacle. At their lower ends the springs 90 are provided with slotted links 92. The latter are pivoted at 93 upon suitable lugs 94 attached upon the lid section 41, as shown in Figures 4, 5 and 6 of the drawings. The lower ends of the springs 90 have slide connections in the slots of links 92 to enable the springs to properly relax and fold in order that the closure section 41 may be swung unobstructed into an upward fully opened position, shown in dotted lines in Figure 4. Of course, when the closure section 41 is in sealed position upon the body of the bucket the springs 90 will be tensioned. The tension line of the springs 90 with the closure sections shut may lie above the hinge point 42 as shown in Figure 4, or directly intersect the hinge axis 42 as shown in Figure 5, or the hinge axis 42 may lie above the line of the springs 90, as shown in Figure 6. For the form of invention shown in Figure 4 the springs 90 under tension will act to normally open the section 41 from a closed position. The tension of the springs 90 in the form of invention shown in Figure 5 with the closure 41 shut will have no effect in opening or closing the door, and in the form of invention shown in Figure 6 the tension of the springs 90 will act with a tendency to hold the section 41 closed upon the body.

Figure 7A:
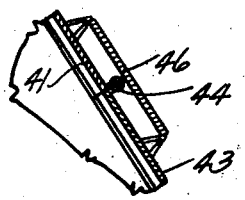

In the form of spring arrangement shown in Figure 3 the springs 46 connecting the upper and lower sections 41 and 43 may lie below the hinge axis connection of the two closure sections 41 and 43, as shown in Figures 4, 5 and 6, or the springs 46 may intersect the hinge axis 44 as shown in Figure 7, or lie above the hinge axis 44 as shown in Figure 7a. With the lid sections shut the tension springs 46 of Figure 7 will have no effect in opening or closing of the doors, but in Figure 7a the springs 46 will act with a tendency to swing the lower lid section 43 open.

It is within contemplation of my invention to duplicate the entire closure construction 41 and 43 and associated spring arrangement at the front end of the bucket body B, for loading or charging purposes.

In the form of invention F, with the bucket tilted in dumping position, the door sections 41 and 43 will hang vertically in the same plane and slide over the dumped trash or debris as the truck advances. The operator can very readily swing the top door section 41 to an up position for charging, such as shown in dotted lines in Figure 4. The lower lid section 43 will be overswung. In all forms of the spring construction shown in Figures 4, 5, 6, 7, and 7a, the effect of the springs is such that with normal effort a man can easily open the doors with a swing to their up position. Generally this will take about a 40 pound lift.

Return from ordinary dumping position to horizontal will enable the springs to usually completely close the lids, but if dumping upon a sanitary fill and the vehicle is driven forward so as to drag the lids over debris, return of the bucket from such dumping may not completely close the lid 43.

Referring to the bucket shown at G in Figure 12, such is shown in greater detail and more fully described in my copending application above mentioned. The receptacle G is provided with a tensioned spring 150 secured at its front end to a standard or lug 152 on the top wall of the body of the receptacle. It normally lies parallel with the top wall when the receptacle is in horizontal position. Its rear end has a flexible cable 153 connected thereto. This cable 153 is trained over a pulley or sheave 154 mounted upon the outer end of the lower lid 43. The cable 153 is doubled back upon itself and is releasably trained over a pulley or sheave arrangement 156 mounted upon the hinged end of the closure 41 (see Figure 12). This doubled portion of the cable 153 only engages the sheave 156 when the receptacle G is in rest position, or tilted only slightly with the lids closed. It moves away from the sheave 156 when the receptacle E is in dumping position. The front end of the cable 153 is trained over a sheave or pulley 160 mounted on the front upper margin of the receptacle body and from thence the cable 153 extends along the front wall of the receptacle E and at its lower end is provided with a preferably rigid sleeve member 162 which is slidable in a socket or passageway of a guide 164. These details are more fully shown in my copending application above mentioned. This guide 164 is welded or otherwise secured to the front wall of the receptacle body. The sleeve 162 is of such dimension that it may readily slip into the passageway of guide 164, but cannot slip upwardly therefrom because of a cross bar 165 which is connected thereto. The cross bar 165 has flexible chains 167 and 168 which are more particularly described in my copending application above mentioned. The lower lid section 43 is secured to the lid section 41 by a hinge construction 170, the axis 171 being located above the line of the cables extending between the sheaves or pulleys 154 and 156, so that the effort of the spring 150 will normally hold the lower lid portion 43 closed. This effort will be overcome during tilting of the bucket, at a tilting angle which enables the weight of the lid section 43 to swing outwardly slightly so that the cables adjacent the hinge 170 pass outwardly beyond the axis 171, and at which time the spring 150 will tend to further open the lower closure 43. If desired, stops 180 may be provided upon the upper section 41 of the closure construction in order to limit the opened relationship of the closure section 43 with respect to the closure section 41.

Referring to the improved latch mechanism E, I prefer to locate the same entirely upon the sloping lower section 15 of the bucket body. This avoids increasing the weight of the closure. Such placement will not subject the fasteners to the abuse they receive if located upon the side walls of the bucket.

Referring to details of the latch construction E, I preferably provide two of them upon the rear wall portion 15, close to but spaced from the side walls, as shown in Figures 2 and 3 of the drawings. The rear wall 15 is provided with a reinforcing channel 100 welded thereto at the marginal edge below the rear opening 40 of the bucket, and for each latch or fastener I may provide a plate 101 welded to the channel 100. The latch includes a fastening lever 102, pivoted at 103 upon lugs or ears 104 which may be welded upon the plate 101, in the position shown in Figures 8 and 9 of the drawings. The latch lever 102 may be slightly angled; the upper portion 102ᵃ thereof, above the pivot 103, being adapted to engage the rear closure, as shown in dotted lines in Figure 8 of the drawings, and the lower handle portion 102ᵇ extending downwardly a sufficient length to enable the same to be grasped for manipulation. A detent means is provided for holding the latch lever in either opened or closed position. This may consist of an arm 107 welded upon the plate 101 having a preferably adjustable detent lug or head 110 secured thereto (see Figure 10). The head is positioned so that the portion 102ᵇ of the latch lever must be sufficiently springy to pass detent 110. The portion 102ᵇ of the lever is resilient enough to permit this. It normally springs back into position, either forwardly or rearwardly of the detent 110, so that the latch lever will hold its opened or closed position.

In order to prevent injury to the latching mechanism I prefer to provide a channel-shaped hood or cover 115 welded to the plate 101 which houses the lever at the location of its hinge connection. This guard 115 may have an outer wall sufficiently spaced from the pivot location 103 to permit free manipulation of the lever construction. Buckets and receptacles of this sort are subject to severe handling. This guard, and not parts of the latch will contact walks, streets, debris at sanitary fills or dumps, and curbs at incinerator pits, etc. or other obstructions when bucket is being dumped, and walls of platforms when bucket is being placed for filling.

It can thus be understood that the latching mechanism for the closures of the bucket or receptacle at the charging and dumping opening or openings, is of such nature that it may be made up and assembled as a unit. It is so compact that it may be placed upon the body of the bucket, taking into account variation in construction of the bucket. It provides for efficient holding of the lids in closed position. They will not jar open during transit and thus permit losing of the bucket load. The latch unit is located directly upon the body structure of the bucket. This enables the doors or closures to be kept as light in weight as possible in order that spring effort will operate with maximum efficiency. The latch mechanism may be opened or closed with one hand while the operator may use the other hand to exert some pressure on the lid for urging the sealing material around the door and opening of the body into effective sealing position.

It is noted that the arm 107 is provided with an outer opening 118 which is adapted to align with an opening 119 provided in the portion 102ᵇ of the lever to receive a padlock or other locking means by which the latching lever may be locked for holding the lids of the receptacle in a closed position, against unauthorized opening.

In the modified form of latching means H shown in Figure 11 I may provide a latch bar or rod 120 bearing at its ends upon the wall 15, one end upon lug 104, similar to that above described, and its other end upon lug 104ᵃ. This latch bar 120, is provided with a handle 121 corresponding to the handle portion 102ᵇ, above described, with which may be associated a detent mechanism (not fully shown), the same as above described for the form of invention shown in Figures 8 and 9. The handle 121 is located at one end of the latch bar 120. The latch bar 120 is preferably provided with a series of latch levers 125, at suitable locations therealong. In Figure 11 three of them are shown and they correspond to lever parts 102ᵃ as above described for the form of invention shown in Figures 8 and 9. Swinging the handle 121 will move the latching levers 125 to permit opening of the lid of the receptacle construction or the holding of the same closed against accidental or unauthorized opening.

Various changes in the shape, size and arrangement of parts may be made to the form of invention herein shown and described without departing from the spirit of the invention or scope of the claims.

I claim:

1. In a loading and dumping receptacle contruction, the combination of a body including a bottom, top and upstanding walls, one of the upstanding walls having a loading and dumping opening therein, a multiple sectioned closure for the loading and dumping opening including upper and lower lid sections hingedly connected one to another, means hingedly connecting the upper lid section to the body above the loading and dumping opening, an elongated tension spring connected to the body above said opening and to the upper lid section below its hinge connection with the body, the connections of said spring being disposed at opposite sides of the hinge axis of the said upper lid section upon the receptacle with the line of tension action of the spring lying close to but below the hinge axis of the upper lid section upon the receptacle so that as the receptacle body is rearwardly tilted for dumping through said opening the tensioning line of the spring due to the weight of the lid sections will shift to a location at the outside of the hinge axis of the upper lid section away from the receptacle whereby the effort of said spring will swing said lid sections to further opened positions.

2. A receptacle construction as described in claim 1 in which spring means is connected to the upper lid section and the lower lid section across the hinge connection normally acting to initially hold the lower lid section in a closed position when the receptacle construction is in rest nontilted position with the lid sections closed.

3. In a loading and dumping receptacle construction the combination of a body including rigidly connected bottom, top and upstanding walls, the latter having a rear loading and dumping opening therein, a multiple section closure for the loading and dumping opening including upper and lower lid sections hingedly connected one to another, means hingedly connecting the upper lid section to the body above the loading and dumping opening, elongated tension springs each connected at their ends to the two lid sections and each extending across the hinge connection of said lid sections and under tension when the lid sections are closed whereby to enable easy opening of the lower lid section upon the upper lid section upon lifting of the lower lid section or rear tilting of the body, and elongated tension springs connected at an end of each to the upper lid section and having connection at their opposite ends with the body of the receptacle above the hinge connection of the upper lid section with the body whereby when the upper lid section is swung to opening position it will fully open to a position beyond the normal top wall of the receptacle for fully exposing said loading and dumping opening.

4. A receptacle construction as described in claim 3, in which the tension springs which connect the upper lid section to the body are of the spiral hollow spring type and the end connection of each of them with the upper lid section includes a link pivoted upon the upper lid section upon which the adjacent ends of the said upper lid section springs are slidably connected so that when the upper lid section is thrown to an opened position the springs connected to the body will relax and permit the links to slide into the respective springs whereby to enable the lids to open for fully exposing the loading and dumping opening.

5. In a loading and dumping receptacle construction, the combination of a body including a bottom, top and upstanding walls, one of the upstanding walls having a loading and dumping opening therein, a multiple sectioned closure for the loading and dumping opening including upper and lower lid sections hingedly connected one to another, means hingedly connecting the upper lid section to the body above the loading and dumping opening, an elongated tension spring connected to the body at one end and to the upper lid section below its hinge connection with the body at its other end, the connections of said spring being disposed at opposite sides of the hinge axis of the said upper lid section upon the receptacle with the line of tension action of the spring passing directly through the hinge axis of the upper lid section upon the receptacle so that as the receptacle body is rearwardly tilted for dumping through said opening the tensioning line of the spring due to the weight of the lid sections will shift to a location at the outside of the hinge axis of the upper lid section away from the receptacle whereby the effort of said spring will swing said lid sections to further opened positions.

6. In a loading and dumping receptacle construction, the combination of a body including a bottom, top and upstanding walls, one of the upstanding walls having a loading and dumping opening therein, a multiple sectioned closure for the loading and dumping opening including upper and lower lid sections hingedly connected one to another, means hingedly connecting the upper lid section to the body above the loading and dumping opening, an elongated tension spring connected to the body at one end and to the upper lid section below its hinge connection with the body at its other end, the connections of said spring being disposed at opposite sides of the hinge axis of the said upper lid section upon the receptacle with the line of tension action of the spring lying above the hinged axis connection of the upper lid section upon the receptacle whereby the normal tendency of the spring tension in any position of the closure will be to assist in opening the upper lid section to an opened position.

References Cited in the file of this patent
UNITED STATES PATENTS

| | | |
|---|---|---|
| 691,330 | Watson | Jan. 14, 1902 |
| 2,014,591 | Sanders | Sept. 17, 1935 |
| 2,271,444 | Schutz et al. | Jan. 27, 1942 |
| 2,702,142 | Jones | Feb. 15, 1955 |

FOREIGN PATENTS

| | | |
|---|---|---|
| 139,091 | Great Britain | Feb. 26, 1920 |